US012273468B2

(12) United States Patent
Liu (10) Patent No.: US 12,273,468 B2
(45) Date of Patent: Apr. 8, 2025

(54) GROUP DIGITAL CERTIFICATES FOR DEVICE ONBOARDING

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 225 days.

(21) Appl. No.: 17/895,975

(22) Filed: Aug. 25, 2022

(65) Prior Publication Data

US 2024/0073035 A1   Feb. 29, 2024

(51) Int. Cl.
*H04L 9/32* (2006.01)
*H04L 9/30* (2006.01)

(52) U.S. Cl.
CPC .............. *H04L 9/3268* (2013.01); *H04L 9/30* (2013.01); *H04L 9/3247* (2013.01)

(58) Field of Classification Search
CPC ........ H04L 9/3268; H04L 9/30; H04L 9/3247
See application file for complete search history.

(56) References Cited

U.S. PATENT DOCUMENTS

| 2007/0150723 | A1* | 6/2007 | Estable ................. H04W 12/06 713/155 |
| 2014/0082353 | A1* | 3/2014 | Everhart ............... H04L 9/3247 713/158 |
| 2019/0089547 | A1* | 3/2019 | Simplicio, Jr. ..... H04L 63/0823 |

* cited by examiner

*Primary Examiner* — Kristie D Shingles
(74) *Attorney, Agent, or Firm* — Greenberg Traurig (57) ABSTRACT

In some aspects, the techniques described herein relate to a device including: a processor; and a storage medium for tangibly storing thereon logic for execution by the processor, the logic including instructions for: storing a group digital certificate, the group digital certificate including a plurality of unique identifier (UID) values and a plurality of corresponding public keys; receiving onboarding data and a digital signature from a client device, the onboarding data including a UID of the client device and a public key of the client device and the digital signature generated using the onboarding data and a private key corresponding to the public key; validating the digital signature using the public key; confirming that the UID matches at least one UID in the group digital certificate; and onboarding the client device.

20 Claims, 8 Drawing Sheets

GROUP DIGITAL CERTIFICATES FOR DEVICE ONBOARDING

FIELD OF THE TECHNOLOGY

At least some embodiments disclosed herein relate generally to creating and using digital certificates and, in particular, to improvements in on-boarding mobile devices using group digital certificates.

BACKGROUND

Organizations frequently must onboard computing devices. As used herein, onboarding refers to registering a computing device with an organization. For example, a telecommunications organization may onboard mobile devices when a customer purchases a new device and authenticates to the network run by the telecommunications organization. Currently, such organizations generate individual digital certificates for each computing device and install these certificates prior to onboarding. Then, during onboarding, each computing device uses its unique certificate to authenticate with the network.

DETAILED DESCRIPTION

Existing systems for onboarding computing devices using digital certificates suffer from various inefficiencies. Specifically, managing individual digital certificates for computing devices consumes significant storage capacity and processing power. Further, there is added complexity in managing such a large number of digital certificates. Testing such systems also proves burdensome as a digital certificate for each test device must be generated.

The example embodiments provide techniques for onboarding computing devices by utilizing a specialized group digital certificate. The group digital certificate groups unique identifiers of authorized client devices and their corresponding public keys. When onboarding, a client device can provide its UID and public key as well as digital signature which allows the service provider to authenticate the device without accessing individual digital certificate for a given device, improving the speed of onboarding devices.

In some aspects, the techniques described herein relate to a device including: a processor; and a storage medium for tangibly storing thereon logic for execution by the processor, the logic including instructions for: storing a group digital certificate, the group digital certificate including a plurality of unique identifier (UID) values and a plurality of corresponding public keys; receiving onboarding data and a digital signature from a client device, the onboarding data including a UID of the client device and a public key of the client device and the digital signature generated using the onboarding data and a private key corresponding to the public key; validating the digital signature using the public key; confirming that the UID matches at least one UID in the group digital certificate; and onboarding the client device.

In some aspects, the techniques described herein relate to a device, the instructions further including generating and transmitting a nonce value to the client device prior to receiving the onboarding data.

In some aspects, the techniques described herein relate to a device, wherein the onboarding data further includes the nonce value.

In some aspects, the techniques described herein relate to a device, wherein the onboarding data further includes a monotonic counter value generated by the client device.

In some aspects, the techniques described herein relate to a device, the instructions further including validating the onboarding data by confirming that the nonce value matches an expected nonce value and confirming that the monotonic counter value is valid.

In some aspects, the techniques described herein relate to a device, wherein the plurality of UID values is stored in a Subject field of the group digital certificate.

In some aspects, the techniques described herein relate to a device, wherein the plurality of corresponding public keys is stored within a Subject Public Key Info field of the group digital certificate.

In some aspects, the techniques described herein relate to a method including: storing a group digital certificate, the group digital certificate including a plurality of unique identifier (UID) values and a plurality of corresponding public keys; receiving onboarding data and a digital signature from a client device, the onboarding data including a UID of the client device and a public key of the client device and the digital signature generated using the onboarding data and a private key corresponding to the public key; validating the digital signature using the public key; confirming that the UID matches at least one UID in the group digital certificate; and onboarding the client device.

In some aspects, the techniques described herein relate to a method, further including generating and transmitting a nonce value to the client device prior to receiving the onboarding data.

In some aspects, the techniques described herein relate to a method, wherein the onboarding data further includes the nonce value.

In some aspects, the techniques described herein relate to a method, wherein the onboarding data further includes a monotonic counter value generated by the client device.

In some aspects, the techniques described herein relate to a method, further including validating the onboarding data by confirming that the nonce value matches an expected nonce value and confirming that the monotonic counter value is valid.

In some aspects, the techniques described herein relate to a method, wherein the plurality of UID values is stored in a Subject field of the group digital certificate.

In some aspects, the techniques described herein relate to a method, wherein the plurality of corresponding public keys is stored within a Subject Public Key Info field of the group digital certificate.

In some aspects, the techniques described herein relate to a non-transitory computer-readable storage medium for tangibly storing computer program instructions capable of being executed by a computer processor, the computer program instructions defining steps of: storing a group digital certificate, the group digital certificate including a plurality of unique identifier (UID) values and a plurality of corresponding public keys; receiving onboarding data and a digital signature from a client device, the onboarding data including a UID of the client device and a public key of the client device and the digital signature generated using the onboarding data and a private key corresponding to the public key; validating the digital signature using the public key; confirming that the UID matches at least one UID in the group digital certificate; and onboarding the client device.

In some aspects, the techniques described herein relate to a non-transitory computer-readable storage medium, the steps further including generating and transmitting a nonce value to the client device prior to receiving the onboarding data.

In some aspects, the techniques described herein relate to a non-transitory computer-readable storage medium, wherein the onboarding data further includes the nonce value.

In some aspects, the techniques described herein relate to a non-transitory computer-readable storage medium, wherein the onboarding data further includes a monotonic counter value generated by the client device.

In some aspects, the techniques described herein relate to a non-transitory computer-readable storage medium, wherein the plurality of UID values is stored in a Subject field of the group digital certificate.

In some aspects, the techniques described herein relate to a non-transitory computer-readable storage medium, wherein the plurality of corresponding public keys is stored within a Subject Public Key Info field of the group digital certificate.

Figure 1:
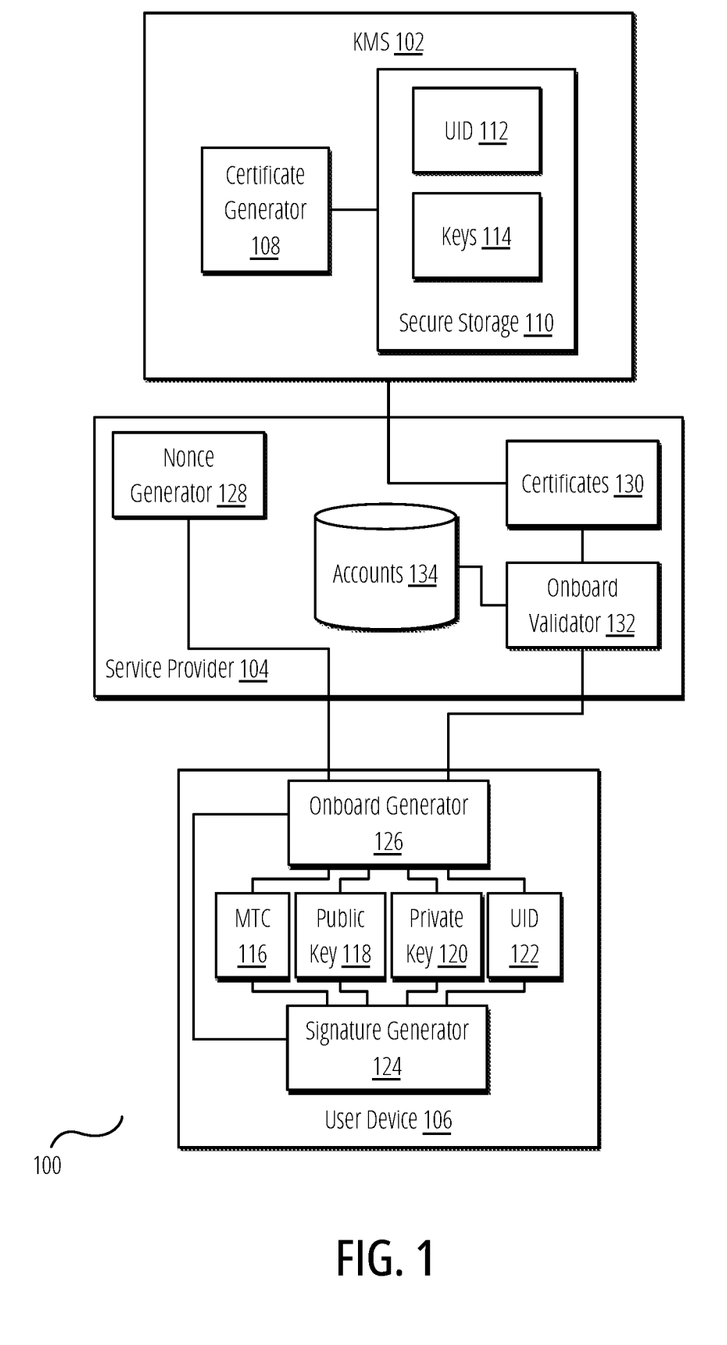
FIG. 1 is a block diagram illustrating a system for onboarding a computing device.

FIG. 1 is a block diagram illustrating a system for onboarding a computing device.

System 100 includes a KMS 102, service provider 104 and user device 106. In some implementations, each of a KMS 102, service provider 104 and user device 106 may be implemented as a computing device such as that depicted in FIG. 6 or 7. Alternatively, in some implementations, a KMS 102, service provider 104 and user device 106 may be implemented as multiple such computing devices.

The KMS 102 includes a secure storage area 110 that can store sensitive data such as UIDs 112 and keys 114. In some implementations, the secure storage area 110 can be implemented as a trusted execution environment (TEE), secure enclave, hardware security module (HSM), or a similar type of secure area. In some implementations, the secure storage area 110 can also include processing components capable of performing cryptographic operations such as encryption, decryption, etc. The KMS 102 further includes a certificate generator 108. In an implementation, certificate generator 108 can comprise logic for generating a group digital certificate based on UIDs 112 and public keys in keys 114. Details of the operations of KMS 102 are provided in FIGS. 2 and 3 and are not repeated herein.

A service provider 104 includes a nonce generator 128, accounts storage 134, onboard validator 132, and group digital certificates 130. In an implementation, service provider 104 receives the group digital certificates 130 from KMS 102. Specifically, service provider 104 can provide a list of UIDs and public keys to the KMS 102 and the KMS 102 can generate group digital certificates 130 (as per FIG. 3) and return these certificates to the service provider 104.

Service provider 104 can store a list of accounts in accounts storage 134. No limit is placed on the format of an account in accounts storage 134 and generally any type of account that can be used to activate or onboard devices can be used. For example, the accounts storage 134 can comprise a subscriber database in a cellular core network or may comprise a database of user accounts in a software-as-a-service application.

The nonce generator 128 can be configured to receive requests from user device 106 and return a random or pseudo-random value to the client for use in later transmissions, as described herein. The onboard validator 132 can comprise a server or similar type of computing device that can receive onboarding data from a client device and validate the onboarding data. The group digital certificates 130 can include one or more group digital certificates used for validating UIDs and public keys in the onboarding data. Details of these operations are provided in more detail in FIGS. 4A and 4B and are not repeated herein.

The user device 106 can include a computing device that stores a public key 118 and corresponding private key 120 and is associated with a UID 122. As illustrated, the user device 106 can include monotonic counter 116 that can generate a monotonic counter value. An onboard generator 126 can access the monotonic counter 116, public key 118, private key 120, and UID 122 (as well as a nonce returned by service provider 104) to generate onboarding data and can provide the onboarding data to a digital signature generator 124 which can generate a digital signature using the onboarding data. Ultimately, the onboard generator 126 can provide the onboarding data and the signature to the service provider 104 for onboarding. Details of these operations are provided in the description of FIG. 5 and are not repeated herein.

Figure 2:
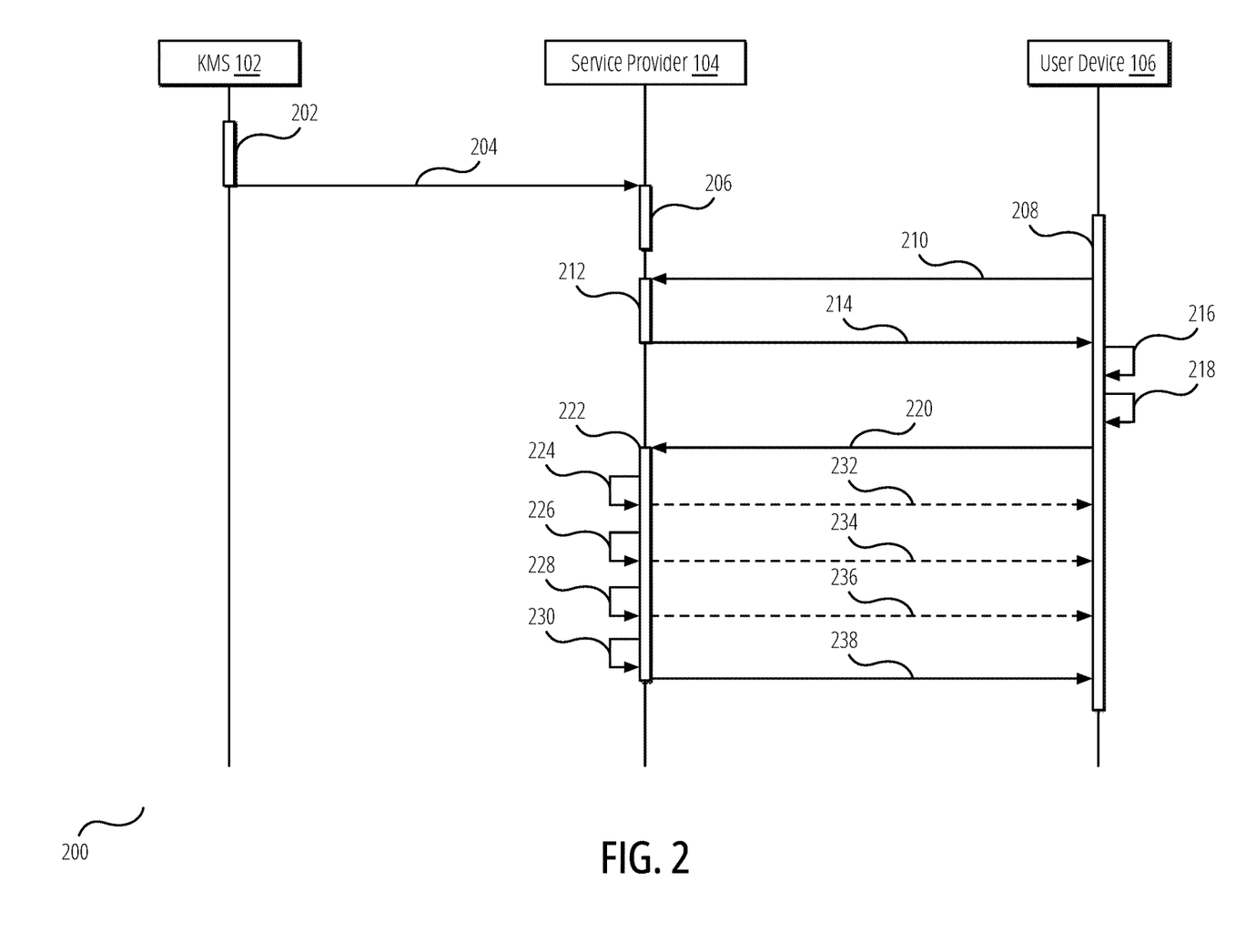
FIG. 2 is an interaction diagram illustrating a method for onboarding a computing device.

FIG. 2 is an interaction diagram illustrating a method for onboarding a computing device.

Figure 3:
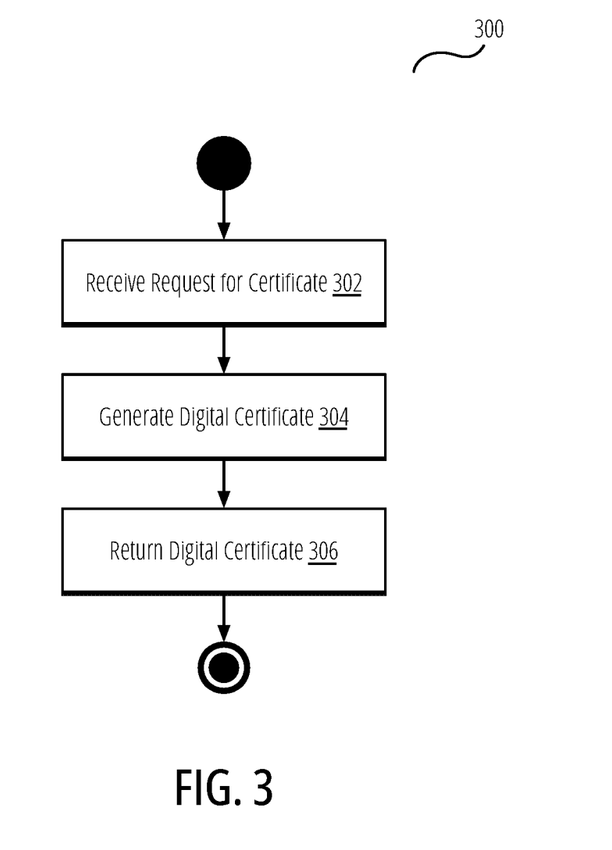
FIG. 3 is a flow diagram illustrating a method for generating a group digital certificate.

In the method 200, a KMS 102, service provider 104, and user device 106 communicate to onboard the user device 106 with the service provider 104. Method 200 can begin with KMS 102 generating a digital certificate in step 202. Reference is made now to FIG. 3 which describes step 202 in further detail.

FIG. 3 is a flow diagram illustrating a method for generating a group digital certificate. As discussed, a KMS 102 can perform method 300, although the disclosure is not limited as such.

In step 302, method 300 can include receiving a request for a digital certificate.

A KMS can receive such a request in various ways. In general, the KMS will receive one or more unique identifier (UID) values associated with computing devices. As one example, these UID values comprise device identifier values unique across a type of device. For example, the devices may be NAND Flash storage devices having globally UID values. As another example, the UIDs can comprise international mobile subscriber identifier (IMSI) values, International Mobile Equipment Identity (IMEI) values, or similar types of unique identifiers. Indeed, the specific format of the UID value is not limiting and any sufficiently unique identifier may be used.

In some implementations, these UIDs are provided to the KMS in the request for a digital certificate. Alternatively, the KMS may store UIDs locally and retrieve the UIDs based on other identifying criteria. For example, the KMS may provision the devices involved in the request and store the device UIDs as part of this process.

In step 304, method 300 can include generating a digital certificate based on the request.

In general, the digital certificate may be similar in structure to an X.509 digital certificate. However, unlike existing digital certificate formats, the digital certificate generated in step 304 will include multiple public keys. Below is a sample certificate that may be generated in step 304:

```
Certificate:
    Data:
        Version: 3 (0x2)
        Serial Number: 3f:81:1c:...:46:a7:bc:f5:d0:b9:74
        Signature Algorithm: ecdsa-with-SHA256
        Issuer: CN=Authenta KMS Certificate Issuer
        Validity
            Not Before: Apr 30 15:50:38 2021 GMT
            Not After : Apr 28 15:50:38 2031 GMT
        Subject: CN= KMS L0 UID1, ... UID10
        Number of Keys: 10
        Subject Public Key Info:
            Public Key Algorithm: id-ecPublicKey
            Public-Key: (256 bit)
            Pub1:
                04:49:7b:ce:2b:42:6b:d8:22:9d:bb:ab:d7:9d:a0:
                71:72:54:f8:3e:c6:a5:e1:f4:ef:65:07:fc:28:e8:
                6c:97:c8:a4:b9:5e:8d:4c:99:76:67:01:f0:bf:27:
                2a:3f:00:98:8d:05:af:8f:6e:9f:67:24:49:c6:88:
                65:ad:c7:18:93
            ...
            Pub10:
                04:49:7b:ce:2b:42:6b:d8:22:9d:bb:ab:d7:9d:a0:
                71:72:54:f8:3e:c6:a5:e1:f4:ef:65:07:fc:28:e8:
                6c:97:c8:a4:b9:5e:8d:4c:99:76:67:01:f0:bf:27:
                2a:3f:00:98:8d:05:af:8f:6e:9f:67:24:49:c6:88:
                65:ad:c7:18:93
    ...
```

As illustrated, the form of the digital certificate may be similar to the form of X.509 certificates and thus various values are truncated (via ellipses) and other non-limiting fields after the "Subject Public Key Info" field are omitted for brevity. However, unlike existing X.509 certificates, the above certificate includes a list of UID values in the Subject field, an identification of the number of public keys in the certificate in the "Number of Keys," and a list of those public keys (Pub1, . . . , Pub10) in the Subject Public Key Info field.

In an implementation, the UID values included in the certificate match the UID values identified in step 302. Further, the KMS may store cryptographic key data for each UID in, for example, an HSM or other secure storage device. As such, method 300 can include loading the public keys associated with the requested UIDs and including those UIDs in the Subject Public Key Info field. Finally, step 304 will also include providing a count of the number of public keys included in the Number of Keys field.

After generating the digital certificate including the above additional fields, step 304 can include signing the digital certificate with a server private key. Finally, in step 306, method 300 can return the digital certificate to the requesting party (e.g., service provider 104). Step 306 may correspond to step 204 of FIG. 2

Returning to FIG. 2, KMS 102 returns the group digital certificate to the service provider 104 in step 204. In process 206, the service provider 104 will store the group digital certificate for later use. Specifically, user device 106 may execute an onboarding process 208 to authenticate with the service provider 104. As one example, the onboarding process 208 may include registering a mobile device with a cellular network for the first time. As another example, the onboarding process 208 may include registering a mobile device with a network service (e.g., software-as-a-service application).

As part of onboarding process 208, the user device 106 issues a request to onboard in step 210. In response, service provider 104 will generate a nonce value in step 212 and return the nonce value in step 214. Upon receiving the nonce value, user device 106 will read a monotonic counter (MTC) value in step 216 and then generate a digital signature in step 218 using its UID, the server nonce, a public key, the server nonce, and the monotonic counter value. This signature will be signed with the device's private key corresponding to the device's public key. In step 220, user device 106 returns the signature, the UID, the server-generated nonce, public key, the server nonce, and the monotonic counter value to the service provider 104.

In response, the service provider 104 performs various checks in process 222, each check potentially returning a failure notification. For example, the service provider 104 can first check the freshness of the request by checking the monotonic counter value in check 224. If the request is not fresh, service provider 104 returns an error in step 232. Next, the service provider 104 can check the signature of the request by validating the signature using the public key sent by the user device 106 in check 226. If the signature is not valid, service provider 104 returns an error in step 234. Next, the service provider 104 can determine if the public key sent by the user device 106 is in the group digital certificate in check 228. If not, service provider 104 returns an error in step 236. Finally, if the preceding checks pass, service provider 104 can onboard the user device 106 in step 230 and return a success message in step 238.

Figure 4A:
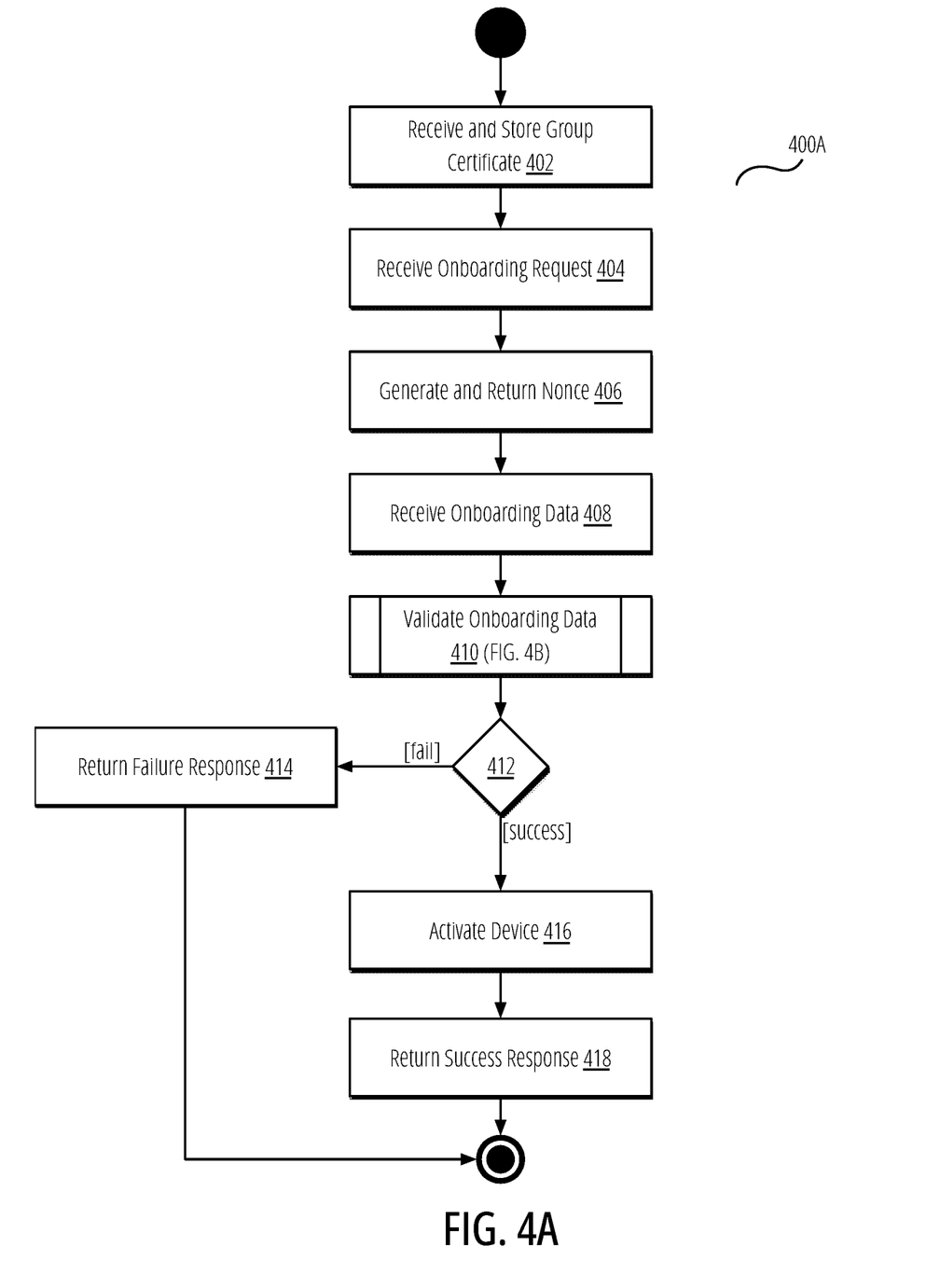
FIG. 4A is a flow diagram illustrating a method for validating an onboarding request received from a computing device.
Figure 4B:
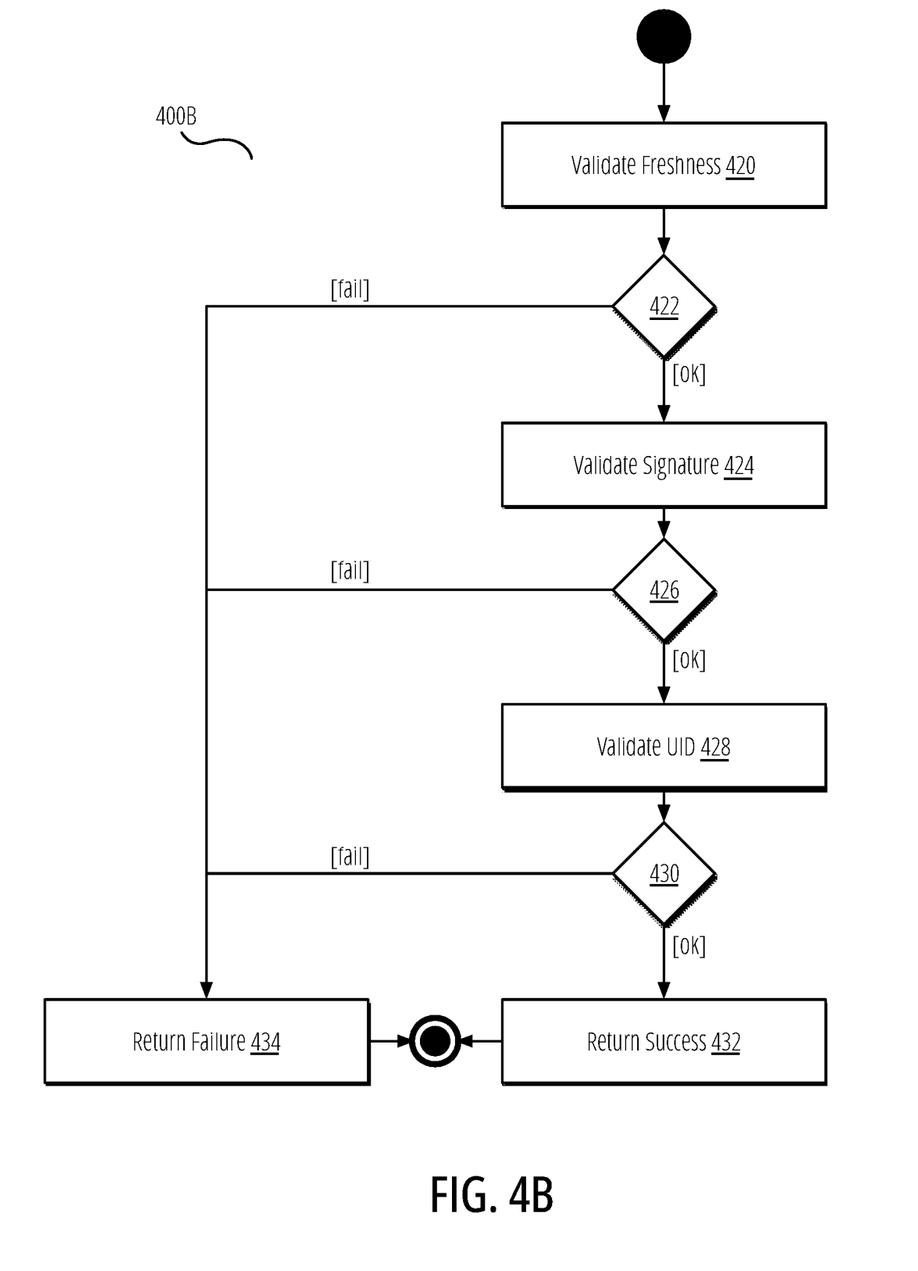
FIG. 4B is a flow diagram illustrating a method for validating onboarding data.

Details of the specific operations performed by the service provider 104 in the above process are described in more detail in FIGS. 4A and 4B. Details of the specific operations of user device 106 in the above process are described in more detail in FIG. 5. Reference is now made to those figures for further detail on the above process.

FIG. 4A is a flow diagram illustrating a method for validating an onboarding request received from a computing device.

In step 402, method 400A can include receiving and storing a group digital certificate. As discussed above, the group digital certificate may be generated by a KMS and may include multiple UIDs and multiple public keys. The group digital certificate may be signed by the KMS and thus verifiable by method 400A. Step 402 can include storing the group digital certificate in a secure storage device such as an HSM.

In step 404, method 400A can include receiving an onboarding request from a computing device (also referred to as a client device).

In some implementations, such an onboard request can be transmitted over a network and received by method 400A. For example, method 400A may operate a Hypertext Transfer Protocol (HTTP) or similar endpoint to receive such requests. In some implementations, the onboarding request may not include any client-side data. In other implementations, the onboarding request may include a UID, client-side public key (e.g., a public key of the device issuing the onboarding request), and a monotonic counter value. These values are described in more detail below but may be transmitted earlier (in step 404) as desired.

In step 406, method 400A can include generating and returning a nonce value. In an implementation, the nonce value can include any type of random or pseudo-random value. In some implementations, the nonce value can also include a timestamp value. As illustrated, method 400A generates a nonce value for each onboarding request ensuring that each onboarding request is uniquely handled, as will be discussed. Method 400A may return only the nonce value as a response to the onboarding request for further processing by the computing device (discussed in FIG. 5).

In step 408, method 400A can include receiving onboarding data. Details of generating such onboarding data are included in FIG. 5 and not repeated herein. In general, the onboarding data will include client-identifying data and a digital signature. In one implementation, the client-identifying data includes a UID and public key of the computing device that is onboard with method 400A. In some implementations, the client-identifying data can also include a monotonic counter value generated by the client device. In other implementations, the client-identifying data can also include a nonce (i.e., a random or pseudo-random value) value generated by the client device. Further, the client-identifying data is signed using a private key corresponding the public key included in the client-identifying data to generate a digital signature. Various known algorithms may be used to generate keys and signatures including, without limitation, Rivest-Shamir-Adleman (RSA), Elliptic Curve Digital Signature Algorithm (ECDSA), or similar algorithms. In general, the form of the onboarding data may be:

$$\text{onboarding}=\text{client}\|sig(sk,\text{client}),$$

where client represents a combination of client-side data, sig represents a digital signature algorithm having a signing key as a first parameter and data to sign as a second parameter, sk represents a private key corresponding to a public key in the client-side data, and ∥ represents a concatenation operator (or similar type of combination). In some implementations, client can be represented as:

$$\text{client}=UID\|pk\|\text{nonce}\|mtc,$$

where UID is the unique identifier of the client device, nonce is the server-genreated nonce, pk is the public key corresponding to sk, and mtc is the value of a monotonic counter.

In step 410, method 400A can include validating the onboarding data. Details of this process are described in FIG. 4B, described herein.

Returning to FIG. 4A, in step 412, method 400A can include determining if the onboarding data was valid. If any of the checks in FIG. 4B fail, method 400A proceeds to step 414. In step 414, method 400A can ignore the onboarding request and return a failure message to the client device. For example, method 400A can alert that client device that onboarding was not successful. In some implementations, method 400A can provide additional detail such as which check failed to allow the client device to attempt onboarding again after addressing the failed check.

By contrast, if all the onboarding data was validated, method 400A proceeds to step 416 where the device is activated. Specific details on activating a client device are not limiting and may vary based on the operations of the service provider executing method 400A. For example, a cellular network service provider may associate the client (i.e., mobile) device with a cellular account stored in a database. Finally, in step 418, method 400A can return a success response to the client device. Such a response indicates that the onboarding was successful, and that the client device may participate in communicating with the service provider as an authenticated device.

FIG. 4B is a flow diagram illustrating a method for validating onboarding data.

In step 420, method 400B can include validating the freshness of onboarding data received from a client device.

As discussed above, the onboarding data provided by the client may include a monotonic counter value. As used herein, a monotonic counter value refers to a value that increases by a certain amount each time client device reads the monotonic counter value. In some implementations, the monotonic counter value can be implemented in hardware while in other implementations the monotonic counter value can be implemented in software. Generally, the monotonic counter value maintains its state across power cycles. That is, the monotonic counter value continues to increment each read regardless of whether the client device is powered off. In some implementations, method 400B can maintain a corresponding expected monotonic counter value. Thus, in step 420, method 400B can compare the received monotonic counter value with the expected monotonic counter value to validate the freshness of the onboarding data. In other implementations, similar types of freshness primitives such as nonce values can be used as well to prevent replay attacks. In some implementations, step 420 can also include validating the nonce in the onboarding data to confirm the returned nonce matches the expected nonce generated by the server.

In step 422, method 400B determines if the freshness of the onboarding data was valid when checked in step 420. If not, method 400B proceeds to step 434, where a failure is raised. As discussed in FIG. 4A, in response to such a failure, method 400A can return a failure message to the client (step 414). By contrast, if the freshness of the onboarding data is valid, method 400B proceeds to step 424.

In step 424, method 400B can include validating a signature included with the onboarding data.

The onboarding data received by method 400B also includes a digital signature generated by the sending client device. As discussed, the onboarding data includes the public key of the client device. In step 424, method 400B extracts this public key and uses the public key to validate the signature. Verification of a digital signature using a public key can be performed using any standard method. For example, method 400B can hash the onboarding data and then decrypt the signature using the public key to generate a second hash and compare the hashes to confirm that the signature is valid.

In step 426, method 400B determines if the signature was valid when checked in step 424. If not, method 400B proceeds to step 434, where a failure is raised. As discussed in FIG. 4A, in response to such a failure, method 400A can return a failure message to the client (step 414). By contrast, if the signature is valid, method 400B proceeds to step 428.

In step 428, method 400B can include determining if a UID in the onboarding data is valid. As discussed above, the UID can comprise any unique value identifying the client device such as a device UID, an IMEI, IMSI, serial number, etc. In an implementation, validating the UID can include determining if the UID provided in the onboarding data is also included in a group digital certificate. In some implementations, method 400B may store multiple group digital certificates and step 428 can include determining if any of these group digital certificates include the UID. As discussed in connection with FIG. 3, UID values may be stored in the Subject field of the group digital certificates. Thus, step 428 can include analyzing one or more Subject fields of the group digital certificates to determine if a UID is present. If so, the UID is determined to be valid. If not, the UID is determined to be invalid.

In step 430, method 400B determines if the UID in the onboarding data was valid when checked in step 428. If not, method 400B proceeds to step 434, where a failure is raised. As discussed in FIG. 4A, in response to such a failure, method 400A can return a failure message to the client (step 414). By contrast, if the UID in the onboarding data is valid, method 400B proceeds to step 432.

In step 432, method 400B can include returning a success message to the calling process (e.g., method 400A). As discussed in FIG. 4A, if all of the above validations pass, the calling process can proceed to onboard the device (e.g., step 416). The foregoing validations thus allow for a process to validate that a client device should be allowed to onboard to a service. First, method 400B confirms that the request is fresh and not replayed by a malicious user. Next, method 400B confirms that the received UID was generated by the owner of the public key provided, proving that the UID was not stolen and used by another party. Finally, method 400B confirms that the UID is known to the service and should be allowed to onboard.

Figure 5:
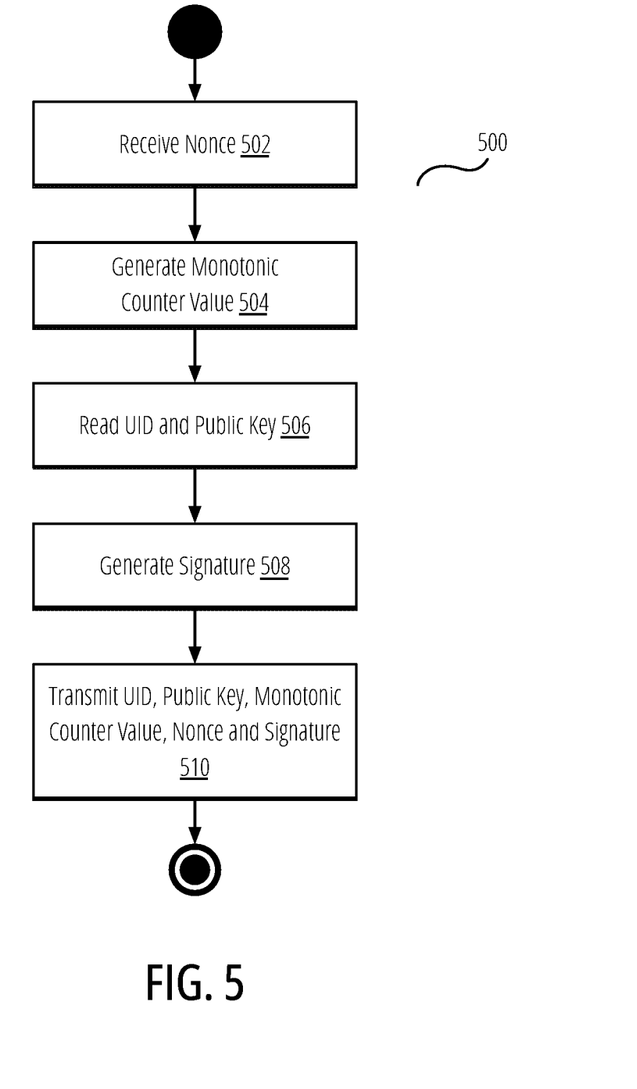
FIG. 5 is a flow diagram illustrating a method for onboarding a computing device.

FIG. 5 is a flow diagram illustrating a method for onboarding a computing device. In some implementations, method 500 can be executed by a client device that is attempting to onboard with a service provider.

In step 502, method 500 can include receiving a nonce value. In some implementations, the nonce value comprises a random or pseudo-random value generated by a server device of the service provider. Method 500 may receive the nonce value as part of an onboard request (e.g., step 210).

In step 504, method 500 can include generating a monotonic counter value. In some implementations, the monotonic counter value can be implemented in hardware while in other implementations the monotonic counter value can be implemented in software. Generally, the monotonic counter value maintains its state across power cycles. That is, the monotonic counter value continues to increment each read regardless of whether the client device is powered off. Thus, in step 504, the client device can read this monotonic counter value which is then automatically incremented upon reading. In other implementations, similar types of freshness primitives such as nonce values can be used as well to prevent replay attacks.

In step 506, method 500 can include reading a UID and public key. In some implementations, the UID and public key can be stored in a secure storage area of the client device such as a TEE or a write-protected region of storage. In some implementations, the UID can be a unique device identifier, an IMSI, an IMEI, serial number, or similar type of unique value that is uniquely associated with the client device.

In step 508, method 500 can include generating a digital signature. In some implementations, the digital signature can be an RSA, ECDSA, or similar type of digital signature. In some implementations, the digital signature can be generated by concatenating the monotonic counter value, nonce value received in step 502, UID, and public key, hashing the concatenated value, and encrypting the concatenated value using the private key corresponding to the public key. Similar types of digital signature algorithms may also be used.

In step 510, method 500 can include transmitting the UID, nonce value received in step 502, public key, and monotonic counter value (the onboarding data) as well as the digital signature to the service provider for validation. As discussed in the previous figures, the service provider will validate the onboarding data and digital signature and return either a success message (if the onboarding was completed) or a failure message (if the onboarding data or signature include invalid data).

Figure 6:
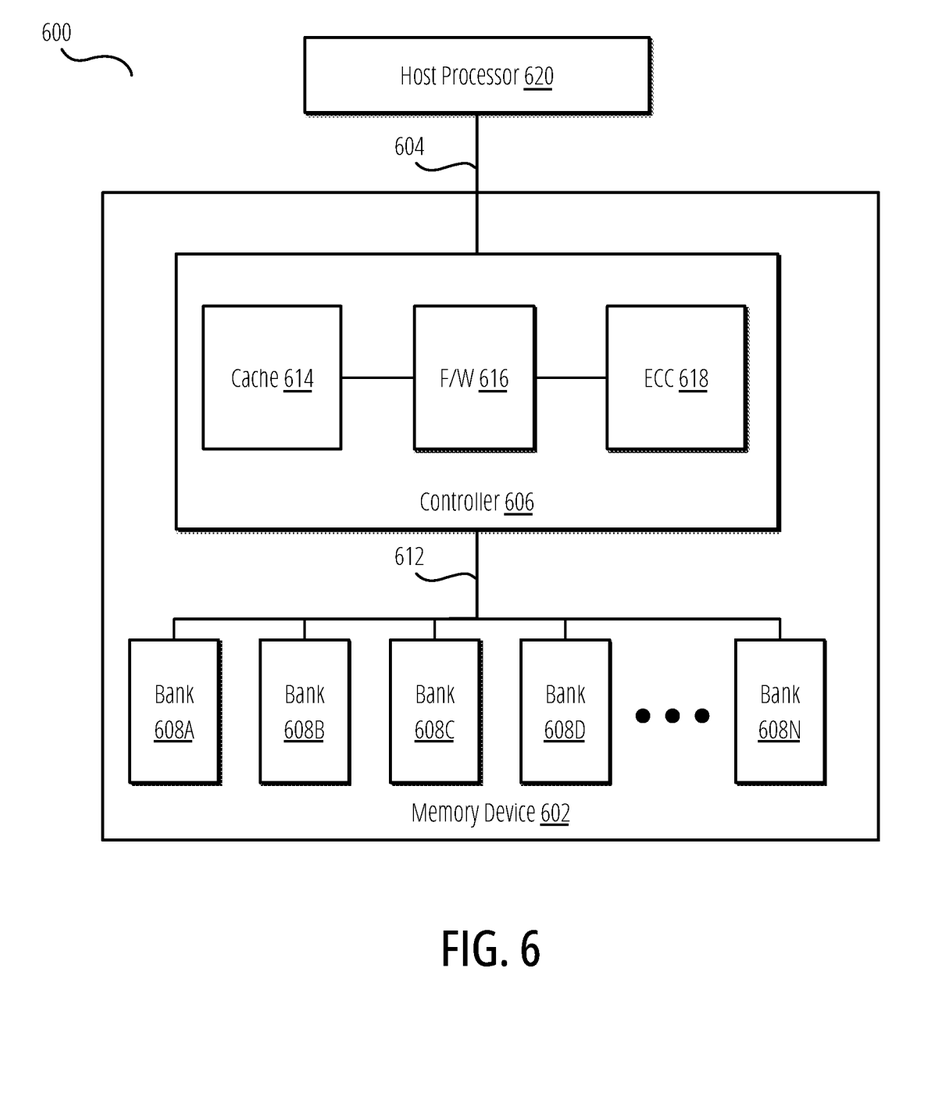
FIG. 6 is a block diagram illustrating a computing system according to some embodiments of the disclosure.

FIG. 6 is a block diagram illustrating a computing system according to some embodiments of the disclosure.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.) forming a memory array via an interface 612. As illustrated, the controller 606 include es a local cache 614, firmware 616, and an ECC module 618.

In the illustrated embodiment, host processor 620 can comprise any type of computer processor, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over the bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, the interface 612 comprises a standard bus for communicating with memory banks (e.g., bank 608A, bank 608B, bank 608C, bank 608D, bank 608N, etc.).

The controller 606 comprises various modules including local cache 614, firmware 616 and ECC module 618. In one embodiment, the various modules (e.g., local cache 614, firmware 616 and ECC module 618) comprise various physically distinct modules or circuits. In other embodiments, the modules (e.g., local cache 614, firmware 616 and ECC module 618) may completely (or partially) be implemented in software or firmware.

As illustrated, firmware 616 comprises the core of the controller and manages all operations of the controller 606. The firmware 616 may implement some or all of the methods described above. Specifically, the firmware 616 may implement the methods described in the foregoing figures.

Figure 7:
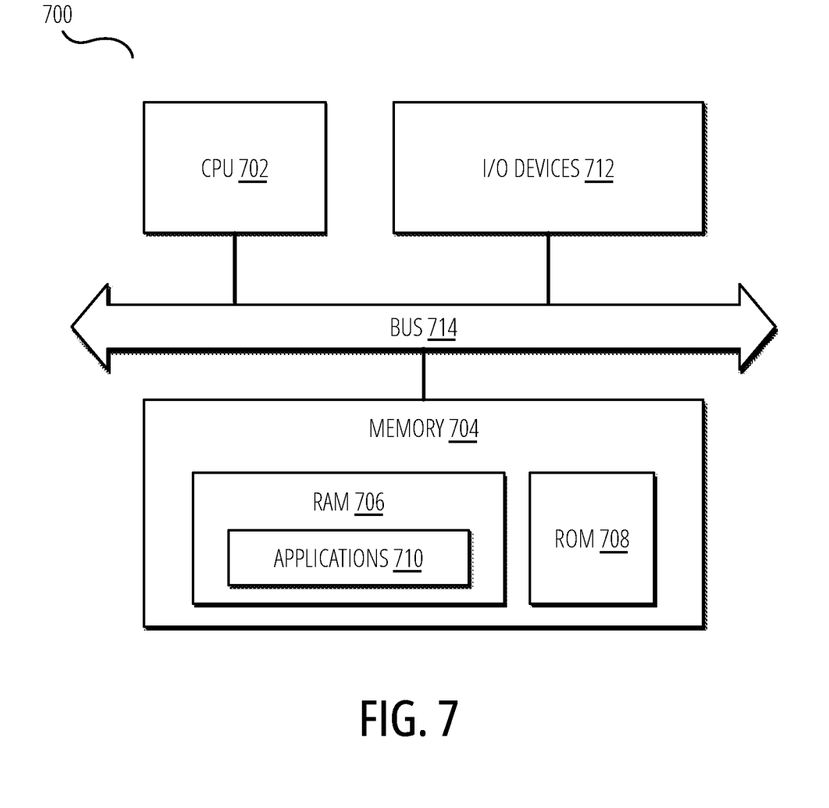
FIG. 7 is a block diagram of a computing device according to some embodiments of the disclosure.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A device comprising:
a processor; and
a storage medium for tangibly storing thereon logic for execution by the processor, the logic comprising instructions for:
storing a group digital certificate, the group digital certificate including a plurality of unique identifier (UID) values and a plurality of corresponding public keys;
receiving onboarding data and a digital signature from a client device, the onboarding data including a UID of the client device and a public key of the client device and the digital signature generated using the onboarding data and a private key corresponding to the public key;
validating the digital signature using the public key;
confirming that the UID matches at least one UID in the group digital certificate; and
onboarding the client device.

2. The device of claim 1, the instructions further comprising generating and transmitting a nonce value to the client device prior to receiving the onboarding data.

3. The device of claim 2, wherein the onboarding data further includes the nonce value.

4. The device of claim 3, wherein the onboarding data further includes a monotonic counter value generated by the client device.

5. The device of claim 4, the instructions further comprising validating the onboarding data by confirming that the nonce value matches an expected nonce value and confirming that the monotonic counter value is valid.

6. The device of claim 1, wherein the plurality of UID values is stored in a Subject field of the group digital certificate.

7. The device of claim 5, wherein the plurality of corresponding public keys is stored within a Subject Public Key Info field of the group digital certificate.

8. A method comprising:
   storing a group digital certificate, the group digital certificate including a plurality of unique identifier (UID) values and a plurality of corresponding public keys;
   receiving onboarding data and a digital signature from a client device, the onboarding data including a UID of the client device and a public key of the client device and the digital signature generated using the onboarding data and a private key corresponding to the public key;
   validating the digital signature using the public key;
   confirming that the UID matches at least one UID in the group digital certificate; and
   onboarding the client device.

9. The method of claim 8, further comprising generating and transmitting a nonce value to the client device prior to receiving the onboarding data.

10. The method of claim 9, wherein the onboarding data further includes the nonce value.

11. The method of claim 10, wherein the onboarding data further includes a monotonic counter value generated by the client device.

12. The method of claim 11, further comprising validating the onboarding data by confirming that the nonce value matches an expected nonce value and confirming that the monotonic counter value is valid.

13. The method of claim 8, wherein the plurality of UID values is stored in a Subject field of the group digital certificate.

14. The method of claim 13, wherein the plurality of corresponding public keys is stored within a Subject Public Key Info field of the group digital certificate.

15. A non-transitory computer-readable storage medium for tangibly storing computer program instructions capable of being executed by a computer processor, the computer program instructions defining steps of:
   storing a group digital certificate, the group digital certificate including a plurality of unique identifier (UID) values and a plurality of corresponding public keys;
   receiving onboarding data and a digital signature from a client device, the onboarding data including a UID of the client device and a public key of the client device and the digital signature generated using the onboarding data and a private key corresponding to the public key;
   validating the digital signature using the public key;
   confirming that the UID matches at least one UID in the group digital certificate; and
   onboarding the client device.

16. The non-transitory computer-readable storage medium of claim 15, the steps further comprising generating and transmitting a nonce value to the client device prior to receiving the onboarding data.

17. The non-transitory computer-readable storage medium of claim 16, wherein the onboarding data further includes the nonce value.

18. The non-transitory computer-readable storage medium of claim 17, wherein the onboarding data further includes a monotonic counter value generated by the client device.

19. The non-transitory computer-readable storage medium of claim 15, wherein the plurality of UID values is stored in a Subject field of the group digital certificate.

20. The non-transitory computer-readable storage medium of claim 19, wherein the plurality of corresponding public keys is stored within a Subject Public Key Info field of the group digital certificate.

\* \* \* \* \*